(12) United States Patent
Harris

(10) Patent No.: US 7,340,763 B1
(45) Date of Patent: Mar. 4, 2008

(54) INTERNET BROWSING FROM A TELEVISION

(76) Inventor: Scott C. Harris, P.O. Box 927649, San Diego, CA (US) 92192

(*) Notice: Subject to any disclaimer, the term of this patent is extended or adjusted under 35 U.S.C. 154(b) by 1244 days.

(21) Appl. No.: 09/669,959

(22) Filed: Sep. 26, 2000

Related U.S. Application Data

(60) Provisional application No. 60/161,700, filed on Oct. 26, 1999.

(51) Int. Cl.
| | |
|---|---|
| H04N 7/18 | (2006.01) |
| H04N 5/455 | (2006.01) |
| H04N 7/173 | (2006.01) |
| H04N 5/44 | (2006.01) |

(52) U.S. Cl. .................. 725/81; 725/51; 725/109; 725/112; 348/734

(58) Field of Classification Search ............ 725/81, 725/109, 110, 51, 112; 348/552, 734; 345/168, 345/173, 764, 717, 721; 340/825.69, 3.31; 709/219
See application file for complete search history.

(56) References Cited

U.S. PATENT DOCUMENTS

| | | | |
|---|---|---|---|
| 5,761,606 A | 6/1998 | Wolzien | |
| 5,774,660 A | 6/1998 | Brendel et al. | |
| 5,778,181 A | 7/1998 | Hidary et al. | |
| 5,818,935 A | 10/1998 | Maa | |
| 5,903,816 A | 5/1999 | Broadwin et al. | |
| 5,929,850 A | 7/1999 | Broadwin et al. | |
| 5,949,679 A * | 9/1999 | Born et al. ................ | 700/91 |
| 5,961,603 A | 10/1999 | Kunkel et al. | |
| 6,025,837 A * | 2/2000 | Matthews et al. ......... | 345/721 |
| 6,094,156 A * | 7/2000 | Henty ....................... | 341/176 |
| 6,097,441 A * | 8/2000 | Allport ...................... | 348/552 |
| 6,127,941 A * | 10/2000 | Van Ryzin ............ | 340/825.69 |
| 6,240,555 B1 * | 5/2001 | Shoff et al. ................ | 725/110 |
| 6,243,707 B1 * | 6/2001 | Humpleman et al. ...... | 707/102 |
| 6,411,725 B1 * | 6/2002 | Rhoads ...................... | 382/100 |
| 6,429,846 B2 * | 8/2002 | Rosenberg et al. ........ | 345/156 |
| 6,545,587 B1 * | 4/2003 | Hatakeyama et al. ..... | 340/3.31 |
| 6,618,039 B1 * | 9/2003 | Grant et al. ............... | 345/168 |
| 6,622,306 B1 * | 9/2003 | Kamada .................... | 725/109 |
| 6,647,410 B1 * | 11/2003 | Scimone et al. ........... | 709/206 |
| 6,769,127 B1 * | 7/2004 | Bonomi et al. ............ | 725/39 |

* cited by examiner

Primary Examiner—Kieu-Oanh Bui

(57) ABSTRACT

A system for automatically using internet information which is contained within a commercial on an entertainment medium e.g. television. The system determines information indicative of the web address. This can be done automatically by optical character recognition or by storing information indicative of the web address in an interval of the television signal. Once obtained, the information is sent, either to a user's computer, or to a central office which sends an e-mail to the user. In this way, the information can be used to automatically jump to a web site of the advertiser.

15 Claims, 3 Drawing Sheets

INTERNET BROWSING FROM A TELEVISION

CROSS REFERENCE TO RELATED APPLICATIONS

This application claims the benefit of the U.S. Provisional Application No. 60/161,700, filed on Oct. 26, 1999.

BACKGROUND

The present application describes a technique for automatically capturing Internet addresses that are broadcast as part of an entertainment media.

Many commercials on entertainment media, such as television and radio, include an Internet address therein. For this part of the advertising to be effective, the user must remember these Internet addresses, since they are broadcast as part of the commercial. Therefore, the Internet addresses broadcast on such media are only really effective when they refer to an easy-to-remember domain name.

The simple domain names, unfortunately, are valuable and limited commodities. Great cost can be associated with obtaining a simple name of this type.

In addition, since the address to be displayed must be simple, it does not readily allow any complicated addresses, e.g., subdomains within the main domain.

Non-commercial parts of the entertainment media can also display Internet addresses. For example, a web site associated with a TV show can be displayed during the credits of the TV show.

SUMMARY

The present application teaches a system of allowing information from an entertainment media to be communicated to a computer or other device, which runs an Internet interfacing program, such as a web browser.

In one aspect, the present system automatically calls up the web address that is transmitted by the entertainment media.

In another aspect, the web address is saved for later use.

The web address can be coded to include information about its source. This enables determination of the effectiveness of the advertisement.

BRIEF DESCRIPTION OF THE DRAWINGS

These and other aspects will be described in detail with reference to the accompanying drawings, wherein.

DETAILED DESCRIPTION

Figure 1:
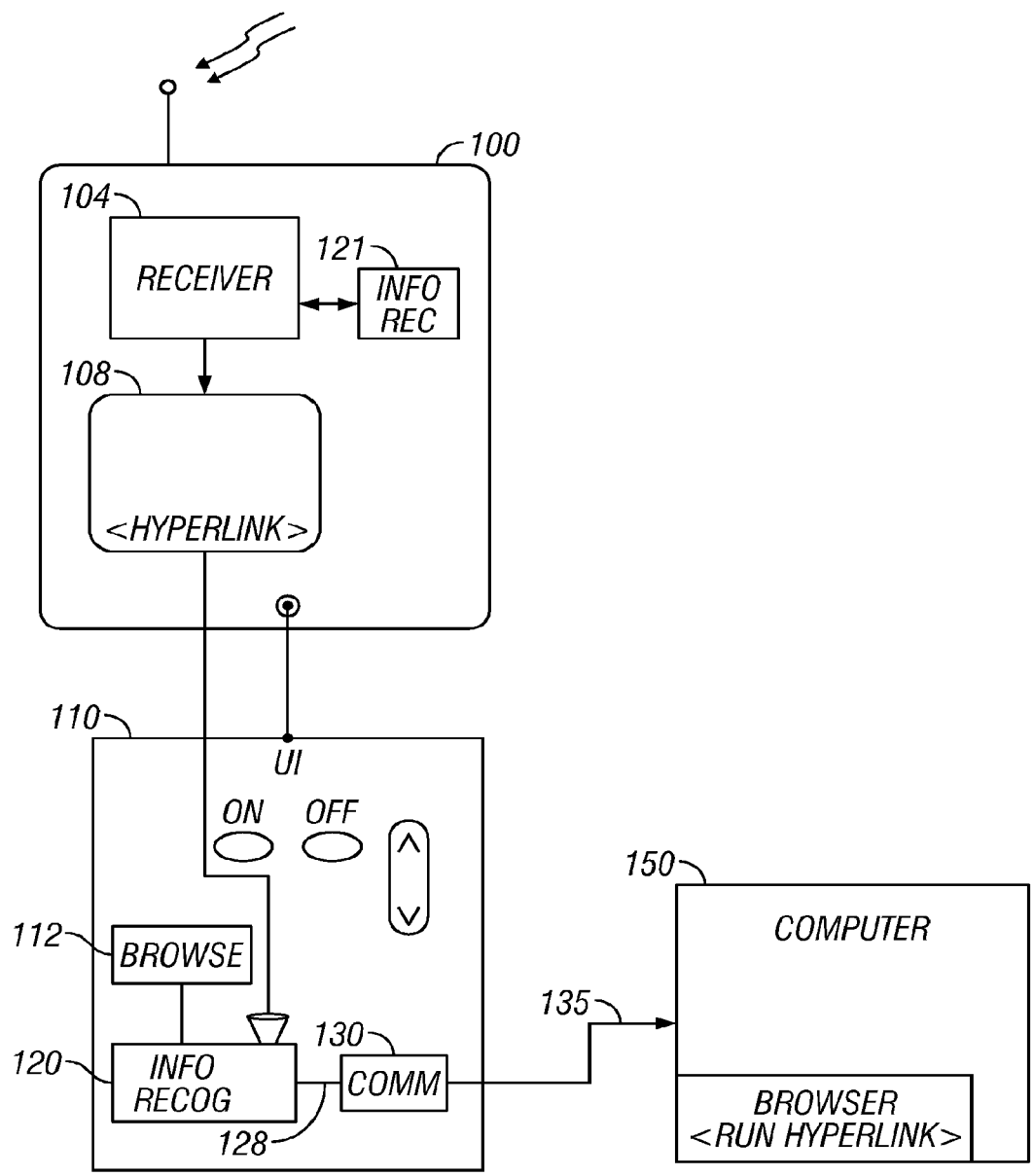
FIG. 1 shows a block diagram of a first embodiment that recognizes the hyperlink.

FIG. 1 shows an embodiment of the present invention, in which the entertainment media is a television system.

A television receiving system 100 is shown receiving a television broadcast 102. The television receiving system includes at least a television receiver element 104, and may also include a television view screen 108. The television broadcast can be via standard transmission, satellite reception, or cable reception or via any other medium for television broadcast.

Some parts of the television broadcast may include Internet addresses. This can be part of the program broadcast or part of a commercial associated with the television broadcast. The Internet address is often transmitted as part of the seen part of the broadcast 102.

The television also includes a user interface, generally shown as 110. The user interface can include one or more of a control panel on the television, a remote control operable by a user, and/or a voice recognition remote control which recognizes voice-activated commands. The user can enter various commands via the user interface 110 include commands to turn-on the television, turn-off the television, change the channels, and the like.

FIG. 1 shows the user interface being a wireless remote control, but the user interface can be part of the television, or part of some other device.

This remote control can also operate the TV. The remote can be infrared, for example. The infrared remote embodiment is a retrofit system for existing television sets. The remote itself is preprogrammed with, or learns codes to, control the television. The remote control can include computing intelligence therein. For example, the remote control can be a personal digital assistant, e.g., a Palm™ computer, programmed to operate as a remote.

The user interface 110 also includes a "browse" function 112. The browse function is actuated when the user wants to use the Internet address that is associated with currently-displayed information on the television screen 108. In a particularly preferred embodiment, actuation of the "browse" button 112 takes some action on an Internet address that is displayed on the television display screen.

An information recognition module 120 is associated with the television set. This module 120 may be within the television set, or, as shown, within the remote control. In a first embodiment shown in FIG. 1, the recognition module can be a miniature camera, located within the remote control system. The recognition module 120 obtains an image of the picture on the television screen 108 by integrating the picture for the time of one or more fields and one or more frames. A processor within the information recognition unit treats the acquired picture as an image, and optically character recognizes ("OCR") the characters within the image.

Optical character recognition programs are known, including programs such as Adobe Circulate™ and Caere Omni Page™.

An image is obtained responsive to the browse command, the image is optically-character-recognized, and the automatically-recognized image is processed to automatically determine a Internet address therein. Automatic detection of hyperlinks can be done by searching for key terms such as "http" or "www" or ".com", ".net" or others (.shop, .web, .firm, .arts, .rec, .info).

This can also be done by correlating each letter of the alphabet across the entire image. For example, the letter "a" can be correlated against the entire image to find all "a"s or close matches to "a"s in the image. By following this procedure throughout the entire image, the closest match to letters can be found within the TV image.

The obtained hyperlink information is used to take some action related to the hyperlink. FIG. 1 shows the remote 110 being equipped with a short-range communication device 130. This capability can be on a so-called "part 15" frequency, e.g. 48 Mhz; 900 Mhz; or 2.4 Ghz. A particularly interesting communication technique is via Bluetooth™ communication. The communication could also be via wireless Ethernet or wired Ethernet. A message 128 is formed based on the automatically-recognized hyperlink within the television image. That message is sent to the communication device 130, and wirelessly transmitted as 135. Information is transmitted in this format to a personal computer 150. The PC receives the automatically-recognized hyperlink.

If the PC or laptop is running and connected to the internet, the address represented by the hyperlink is accessed. The web page is read out and displayed. Alternately, information can be added to the computer, which causes the PC to bring up the web page represented by the hyperlink at the next time the computer is started, or the next time that the browser is started. This can be set as a temporary start page that will be shown only the next time the browser is started.

Alternatively, the information can be added to the user's "Favorites" list, e.g. in a subdirectory called "Look at for further information".

A second embodiment carries out the recognition within the television unit itself. The "browse" command can still be controlled based on a command from a separate remote. A buffer in the TV is used to store an entire frame of RGB information. That information is converted to a gray-scale image. The information in the image is optically-character-recognized. The hyperlink detection is carried out in the same way as in the first embodiment described above. The information recognition unit 121 in the television unit is used.

This embodiment may require modifying the television to include the information recognition unit.

Another embodiment marks the hyperlink in alternative ways. For example, when the hyperlink is displayed on the screen, it can also be marked as a hyperlink in another portion of the television signal, such as in the vertical blanking interval. Line 16 or 21 of the vertical blanking interval can, for example, include digital information indicative of one or more hyperlinks.

Another option reads the hyperlink from within the closed captioning information of the TV signal. This text can be directly used as an Internet address.

In this embodiment, the information recognition unit 120 or 121 is a closed captioning decoder.

Figure 2:
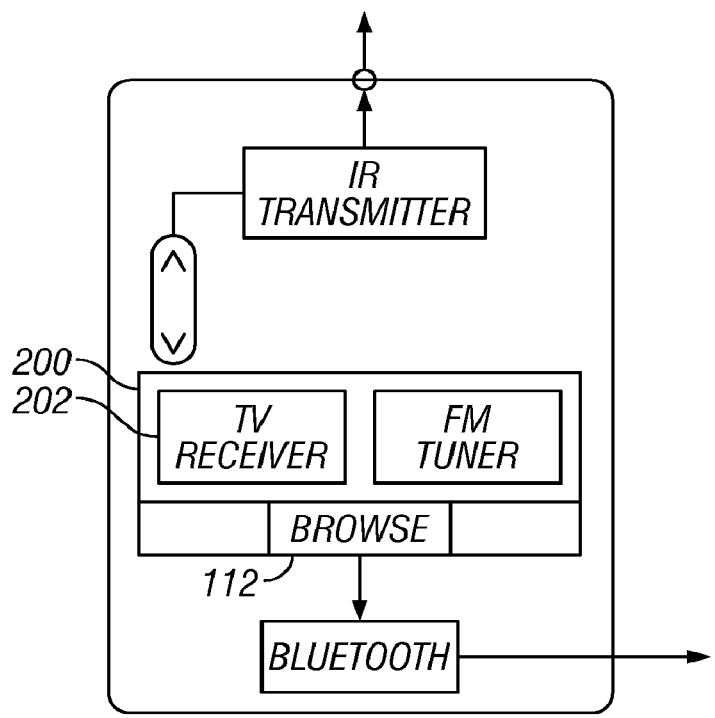
FIG. 2 shows a modification in which the remote includes a receiver element.

Another option shown in FIG. 2 uses a separate receiver 200 within the remote 110. The receiver could be a TV tuner 202 and/or FM tuner 204. The hyperlinks associated with the entertainment program are transmitted on the TV band, e.g. in the closed captioning portion, or in the FM band. The signals are received by the receiver 200. The receiver 200 is constantly receiving the Internet addresses, if any, associated with current media programs. Pressing the "browse" button 112 causes the currently-received hyperlink to be transmitted by a short range communication protocol, such as by Bluetooth™, to the PC.

The TV remote can have a receiver for closed caption information, or for other information within the VBI. This allows the TV remote to be used with the existing television systems and sets, with no modification whatsoever. All new circuitry (if any) is placed within the remote. If a programmed computer or PDA is used as the remote, then all the changes necessary may include reprogramming the user interface.

In another embodiment, the television or set top box associated with the television (e.g., VCR, cable box, or satellite box), can also receive a hyperlink from within the received signal, e.g. coded within the signal. That hyperlink is selected by the browser actuations.

An alternate way of taking the action based on the hyperlink operates by sending information to a service provider, rather than to the PC.

Figure 3:
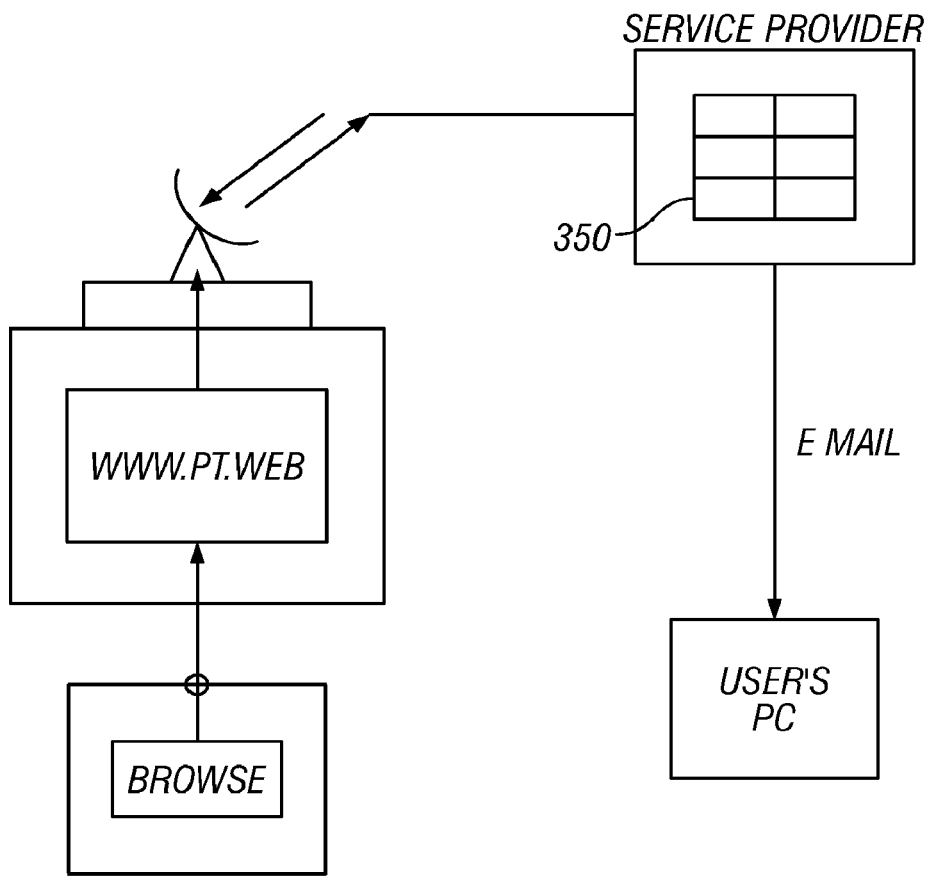
FIG. 3 shows a paradigm in which the service provider participates in sending the desired hyperlink to the user.

FIG. 3 shows this being done over the broadcast channel for two-way media is being used, e.g., in digital cable or satellite. The browse button sends either the hyperlink information to the service provider, or just the timing and channel of the browse actuation to the television provider. In the latter case, the television provider stores a database 350 defining which hyperlink was displayed at any given time.

In this embodiment, the television and/or remote need not even recognize the hyperlink. Rather, an indication is provided to the cable or satellite company to send more information to the user about that hyperlink.

Since the cable or satellite company must have an account with the user, it knows the user's email address. Upon receiving an indication that the user wants more information about the hyperlink that is displayed on the television at that specific time, the cable/satellite company sends an email either to the sponsor or the user directly. The sent e-mail can indicate the web page address.

This embodiment is also suitable for use with radio, since it does not require reading off of the screen.

A new business method becomes possible in this embodiment. The cable/satellite company can charge a fee for this service, e.g. charging a few cents for each user who receives such an e-mail.

Another embodiment uses the power of this system to display a hyperlink that includes an indication of its origin. The web page address is tagged with an indication of the service provider or the specific commercial. For example, a web page address www.pt.web/info=cbs;sd;101999;838 could call up the site pt.web, and provide the site with the identifying information—cbs (network), sd (geographical area), date of commercial airing (101999) and time of commercial airing (838). That tagged web page address hence uniquely indicates the source of the initiation via a specified commercial or program.

The advertisers can use this to determine which times are most successful for web page actuations. The service provider can negotiate a fee for each tagged visit to the web site. A new method of doing business enables using these complicated internet addresses, since the web site is automatically called up from the address. In this new method of doing business, the service provider can guarantee a specified number of "hits" from the commercial. If less hits are obtained, the advertiser may get a discount. The advertiser may also agree to pay additional amounts for "hits" beyond that guaranteed number.

The desired internet information can be displayed directly on the television. It is known to include internet information over the same channel that is carrying television information, e.g. internet over cable (by cable modem), internet by satellite and the like. Alternately, a telephone line or dsl connection can be connected to the TV, and a web TV system or other equivalent system can be used to browse the internet using the screen of the television set. According to this system, actuation of the "browse" button cause either the screen to switch to an internet browsing window, or to a picture-in-picture type system, with the television program remaining in one picture, and the web browser opening in a sub picture.

The alternative is of course possible, where the web browser opens in the main picture, or two side-by-side pictures may be provided.

Another embodiment operates with a computer video card that also includes a TV tuner, such as the ATI All in Wonder™. In this case, TV can be received and viewed on the computer. The same computer can also operate as a conventional computer, e.g., to receive and display Internet information. This embodiment uses the information in the TV (or radio) program to launch and run an Internet page. This information can be displayed on the video, or coded into some other part of the TV signal, or transmitted on some other channel.

Another method of doing business is made possible by this system for sales-type TV, e.g., shopping channels and infomercials. In these media, a salesman extols the virtues of a product, while trying to get the viewers to buy the product. Hyperlinks can be visible or hidden during this sales pitch. The hyperlinks can bring up supplemental internet information, or can be directly linked to a product order site and/or shopping cart. Hence, by actuating the browse key, the user's computer can be actuated to bring up the order form for a product and to begin the ordering process.

As described above, one embodiment uses a PDA as the remote. The PDA has infra red or RF (e.g., Bluetooth), transmission capability. The PDA can also carry out certain functions. For example, since PDAs, such as the Palm™ computer, are capable of hot sync, they can exchange information with another computer, which is presumably a more powerful ("thicker") client. Therefore, the PDA can store the information about the hyperlink, and only later, during the next hot sync, download it to the main computer. The software running the hot sync can act on the hyperlink as described above, e.g., use it next time, add it to favorites, etc.

Also, the shopping information can be supplemented by using the PDA. The hot sync forms an exchange of information, where the thicker client is notified of the PDA's request for information. The thicker client accesses the Internet or some other information source and obtains more information. Then, the PDA is provided with more information about any items where a shopper has expressed interest. That information can be displayed on the PDA, or on the main computer.

A shopping list, or wish list, can also be stored on the PDA, for example.

Another embodiment teaches web browsing using a personal digital assistant such as the Palm. In this embodiment, as noted above, the Palm is configured as a remote control, either to produce infra red signals, or some other kind of signals such as Bluetooth signals which can be received by the entertainment medium. The mote has conventional controls, such as numeral keys 401, up/down keys 402, mute button 403, etc. In addition, the PDA either has its own receiver installed to independently receive hyperlinks either on the same channel as the television signal, or on a different channel. Alternatively, the PDA can receive hyperlink information from a transmitter on the TV, which can transmit by infrared or Bluetooth or the like.

Figure 4A:
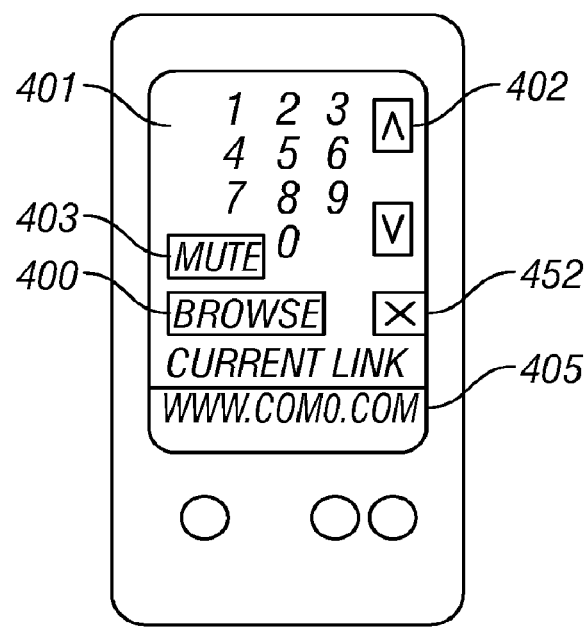
FIGS. 4A and 4B show browsing on a PDA.

One of the available actuations on the PDA-simulated remote is a "browse" actuation 400. When this actuation is actuated, the PDA will begin a browsing actuation to a currently displayed hyperlink 405. In one embodiment as shown in FIG. 4A, the PDA can also have a section within the remote control which can display either the hyperlink, a title of the web page represented by the hyperlink, or the like. The hyperlink can also be any of the previously-described hyperlink systems.

Figure 4B:
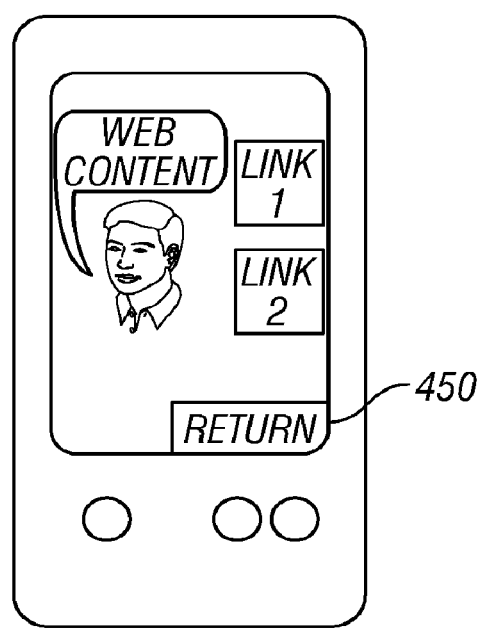

When the browse button 400 is actuated, the PDA is reconfigured from being a remote control into being a web browser, using wireless web browsing techniques, such as used on the Palm VII. The web browser can use any of the conventionally available techniques of PDA web browsing, including a wireless modem, or a short range communication system such as Bluetooth to communicate between the PDA and some server computer such as the user's own PC. One stop wireless web actuation can thereafter be carried out. During the web actuation, a screen as shown in FIG. 4B is displayed. This includes the screen showing the web actuation and may also include a special return button 450 which enables returning to the remote control function. If the user presses the return button 450, he returns to the remote control function The web page remains in memory, and the remote control also shows the "switch" icon 452. In this way, the user can toggle to the remote control function, carry out some operation on the entertainment media, such as muting the TV for example, so that they can better concentrate, and then return to the browsing to read the contents of the web page.

Although only a few embodiments have been disclosed in detail above, other modifications are contemplated and are possible. All such modifications are intended to be encompassed within the following claims. For example, while this application has described television as being the entertainment media, the same operations can be carried out for other media. For example, radio could be continually stored in a buffer of 30 seconds, and then voice recognition techniques could be used to automatically determine hyperlinks within the radio broadcast. Radio could also transmit hyperlinks on a separate carrier, as described above for television.

All such modifications are intended to be encompassed within the following claims.

What is claimed is:

1. A system, comprising:
a television remote which has a first communication part, operating to communicate wirelessly to a television that is controlled by said television remote, said television remote having first buttons controlling at least a plurality of functions on the controlled television, and wherein the controlled television is separate from said television remote, said television remote mounted in a housing, which housing is totally separate from the television being communicated with and controlled by the remote, and said television remote also having a command which accesses information from a supplemental signal that represents a link to additional information, which link can be selected by actuation of said remote to find said additional information from a database that is separate from said remote, and where said additional information provides additional information about a television program which represents program content that has been received over a program content receiving channel and is being currently displayed on a display of the television,
wherein said television remote also includes a second communication part, that operates to communicate wirelessly with a separate computer, to send said additional information to said separate computer indicative of said link having been selected and to cause display of said information from said supplemental signal on a display of the separate computer, and where said display of said separate computer is totally separate from the display of the television.

2. A system as in claim 1, wherein said television remote transmits a command that causes said information to be displayed only at a next startup of a process on said separate computer, and not to be immediately displayed on said separate computer and not to be displayed until said next startup.

3. A system as in claim 1, wherein said information is added to a list of internet favorites on said separate computer, where said list of internet favorites represents internet website addresses obtained from said hyperlink.

4. A system as in claim 3, wherein said supplemental signal is a hyperlink to a website, and said requested information displays said information from said hyperlink on a personal computer.

5. A system as in claim 1, wherein said command actuated by said television remote accesses information and causes an email to be sent to said user.

6. A system as in claim 1, wherein said supplemental signal includes an indication of a referring source.

7. A system as in claim 1, wherein said command actuated by said television remote accesses information and carries out actions that command making a purchase of an item that is displayed on the television.

8. A system as in claim 1, wherein said remote includes a separate receiver which receives supplemental signals that are associated with a program that is currently being displayed on the television.

9. A system as in claim 1, wherein said television program that is currently being displayed on the display of the television, and with which the supplemental signal is associated, is a television program obtained from a television broadcast.

10. A system as in claim 1, wherein said second communication part of said television remote operates to send said additional information to said second computer only if said additional information is selected during a time while it is being displayed, whereby indicating that said access is desired after said supplemental information is displayed does not cause said wirelessly sending.

11. A system as in claim 1, wherein said program content receiving channel is one of a satellite media or cable TV channel.

12. A method, comprising:

using a remote control device for an entertainment media at a first time to produce a wireless signal that is used to control television-displayed programming content that is being delivered by said entertainment media, said remote mounted in a housing, which housing is totally separate from a housing of the entertainment media being controlled by the remote control device; and using said remote control device at a second time, to indicate that access is desired to information associated with a supplemental signal that is associated with a television program which represents program content that is received over a program content receiving channel, that is being currently displayed on the entertainment media, responsive to said remote control device being used to indicate that access is desired to contents associated with said supplemental signal, wirelessly sending information indicative of the supplemental signal to a separate computer, which separate computer has a separate display from said television.

13. A method as in claim 12, wherein said television program associated with the supplemental signal is a television program obtained from a television broadcast.

14. A method as in claim 12, wherein said wirelessly sending operates to wirelessly send said information only if said remote control device is used to indicate that said access is desired during a time while said supplemental information is displayed, whereby indicating that said access is desired after said supplemental information is displayed does not cause said wirelessly sending.

15. A method as in claim 12, wherein said program content receiving channel is one of a satellite media or cable TV channel.

* * * * *